(12) United States Patent
Sekiguchi et al.

(10) Patent No.: US 8,537,136 B2
(45) Date of Patent: Sep. 17, 2013

(54) INPUT DEVICE AND DISPLAY DEVICE INCLUDING THE SAME

(75) Inventors: Shinji Sekiguchi, Kawasaki (JP); Koji Nagata, Hachiouji (JP); Kouji Hayakawa, Chosei (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 309 days.

(21) Appl. No.: 12/761,425

(22) Filed: Apr. 16, 2010

(65) Prior Publication Data

US 2010/0265212 A1    Oct. 21, 2010

(30) Foreign Application Priority Data

Apr. 21, 2009  (JP) ................. 2009-102777

(51) Int. Cl.
*G06F 3/045* (2006.01)

(52) U.S. Cl.
USPC ........ 345/174; 345/156; 345/173; 178/18.01; 178/18.06

(58) Field of Classification Search
USPC ............ 345/156, 173–183; 178/18.01–18.11
See application file for complete search history.

(56) References Cited

U.S. PATENT DOCUMENTS

| | | | | |
|---|---|---|---|---|
| 6,297,811 | B1* | 10/2001 | Kent et al. | 345/173 |
| 2008/0122802 | A1* | 5/2008 | Furuhashi et al. | 345/174 |
| 2009/0256821 | A1* | 10/2009 | Mamba et al. | 345/174 |
| 2012/0044187 | A1* | 2/2012 | Polishchuk et al. | 345/174 |

FOREIGN PATENT DOCUMENTS

| | | |
|---|---|---|
| JP | 2001-209491 | 8/2001 |
| JP | 2003-511799 | 3/2003 |
| JP | 2004-005672 | 1/2004 |
| WO | WO 01/27868 A1 | 4/2001 |

* cited by examiner

*Primary Examiner* — Lun-Yi Lao
*Assistant Examiner* — Insa Sadio
(74) *Attorney, Agent, or Firm* — Antonelli, Terry, Stout & Kraus, LLP.

(57) ABSTRACT

Provided is an electrostatic capacity type touch panel, which responds to not only an input by a finger but also a touch by a nonconductive input member. Disposed are X electrodes XP and Y electrodes YP that cross each other via a first insulating layer 2, and a Z electrode formed of a transparent elastic conductive resin layer 4 via a second insulating layer 3. The transparent elastic conductive resin layer 4 is a high polymer elastic resin layer in which conductive fine particles are dispersed, and is made of a material in which density of the conductive fine particles is increased by pressure of a touch.

13 Claims, 5 Drawing Sheets

INPUT DEVICE AND DISPLAY DEVICE INCLUDING THE SAME

CROSS-REFERENCE TO RELATED APPLICATION

The present application claims priority from Japanese application JP 2009-102777 filed on Apr. 21, 2009, the content of which is hereby incorporated by reference into this application.

BACKGROUND OF THE INVENTION

1. Field of the Invention

The present invention relates to an input device for inputting coordinates on a screen and a display device including the same. In particular, the present invention relates to an input device of an electrostatic capacity type that supports input using such an insulator as a plastic pen, and to a display device including the same.

2. Description of the Related Art

A display device including an input device (hereinafter, also referred to as "touch sensor" or "touch panel") having an on-screen input function of inputting information to a display screen by a touch operation (contact and press operation, hereinafter, simply referred to as "touch") with a user's finger or the like is used for mobile electronic devices such as a PDA and a mobile terminal, various home electric appliances, a stationary customer guiding terminal such as an automatic reception machine, and the like. As a method for achieving the input device using the touch, there are known a resistance film method of detecting a change in resistance value of a touched portion, an electrostatic capacity method of detecting a change in capacity thereof, an optical sensor method of detecting a change in quantity of light at the portion shielded by the touch, and the like.

The electrostatic capacity method has the following advantages when compared with the resistance film method or the optical sensor method. For example, a transmittance of the resistance film method or the optical sensor method is as low as 80%. On the other hand, a transmittance of the electrostatic capacity method is as high as about 90%, thereby preventing a reduction in displayed image quality. In the resistance film method, a touch position is detected by mechanical contact to the resistance film, thereby leading to possible deterioration or breakage (crack) of the resistance film. On the other hand, in the electrostatic capacity method, there is no mechanical contact such as contact of a detection electrode with another electrode. Thus, the electrostatic capacity method is advantageous in durability.

An exemplary electrostatic capacity method is disclosed in JP 2003-511799 A (hereinafter, referred to as Patent Document 1). In the method disclosed therein, a vertical detection electrode (x electrode) and a horizontal detection electrode (Y electrode) are arranged in vertical and horizontal two-dimensional matrix, and a capacity of each electrode is detected by an input processing unit. When a conductor such as a finger touches a surface of the touch panel, the capacity of each electrode increases. Thus, the input processing unit detects the touch to calculate input coordinates based on a signal of a capacity change detected by each electrode. Even when the detection electrode is deteriorated to change its resistance value as physical characteristics, such an influence on capacity detection is limited. Thus, there is only a little influence on input position detection accuracy of the touch panel. As a result, high input position detection accuracy may be realized.

In addition, JP 2004-5672 A describes a method of forming a high polymer layer containing conductive fine particles on a surface of a transparent electrode of a touch panel, thereby obtaining a superior antireflection effect and improving transparency.

SUMMARY OF THE INVENTION

However, in the touch panel using the electrostatic capacity method, as described in Patent Document 1, input coordinates are detected based on the capacity change of each detection electrode. Hence, input means needs to be a conductive substance. Here, a conductive substance is typified by a human finger, and the touch panel using the electrostatic capacity method is recognized as a touch panel for finger input. Thus, there is a problem in that, when a resin-made stylus as a nonconductive insulator used by the resistance film method is brought into contact with the touch panel using the electrostatic capacity method, almost no capacity change occurs in the electrode, which disables detection of the input coordinates.

On the other hand, in case that an input operation is performed on the touch panel using the electrostatic capacity method with the use of a stylus made of a conductive material such as a metal, the number of electrodes need to increase. For example, it is assumed that an electrostatic, capacity type touch panel having a diagonal size of 4 inches and a vertical and horizontal size ratio of 3:4 is realized in an electrode shape based on a diamond shape as described in Patent Document 1. In the case of finger input, if a minimum contact surface has a diameter of 6 mm, and detection electrodes are prepared by using this size as an electrode interval, the total number of electrodes is 22. If a contact surface of the stylus has a diameter of 1 mm, and detection electrodes are prepared by using this size as an electrode interval, on the other hand, the total number of electrodes is 139, which indicates an increase of about six times. The increased number of electrodes causes an increase in frame area necessary for laying wiring lines connected to the input processing unit, and an increase in number of signal connections with a control circuit, consequently lowering reliability against shock and the like. Further, a circuit area increases due to an increase in number of terminals of the input processing unit, thereby leading to a fear of a cost increase. On the other hand, if a stylus with a tip made of conductive rubber is used, assuming the same total number of electrodes, a shape having a diameter of approximately 6 mm is necessary as a contact surface, with the result that input of characters may be accompanied with discomfort.

In view of the above, the electrostatic capacity type touch panel disclosed in Patent Document 1 has a challenge to support an input with an insulating substance (support a stylus).

In order to meet the above-mentioned challenge, the present invention employs an electrostatic capacity type touch panel including: a plurality of X electrodes; a plurality of Y electrodes; and a Z electrode as a transparent elastic conductive resin layer. In the electrostatic capacity type touch panel, each of the plurality of X electrodes and each of the plurality of Y electrodes crosses each other via a first insulating layer, and are formed so as to alternately array pad portions and thin line portions in extending directions of the each of the plurality of X electrodes and the each of the plurality of Y electrodes. The pad portion of the each of the plurality of X electrodes and the pad portion of the each of the plurality of Y electrodes are disposed so as not to overlap each other in plan view. The Z electrode is a transparent electrically elastic conductive resin layer in which conductive fine particles are dispersed. Therefore, density of conductive fine particles that are dispersed thereinside is increased as the conductive fine particles clump by the pressure of touch, with the result that a resistance value of the Z electrode is decreased. Thus, even if nonconductive input means is used, a capacity change between the Z electrode (the part having the resistance value decreased by the pressure) and the X electrode as well as the Y electrode may be detected so that coordinates of the touched position may be determined.

The electrostatic capacity type touch panel of the present invention may support an input by not only a finger but also an insulator such as a resin pen.

DETAILED DESCRIPTION OF THE INVENTION

Figure 1:
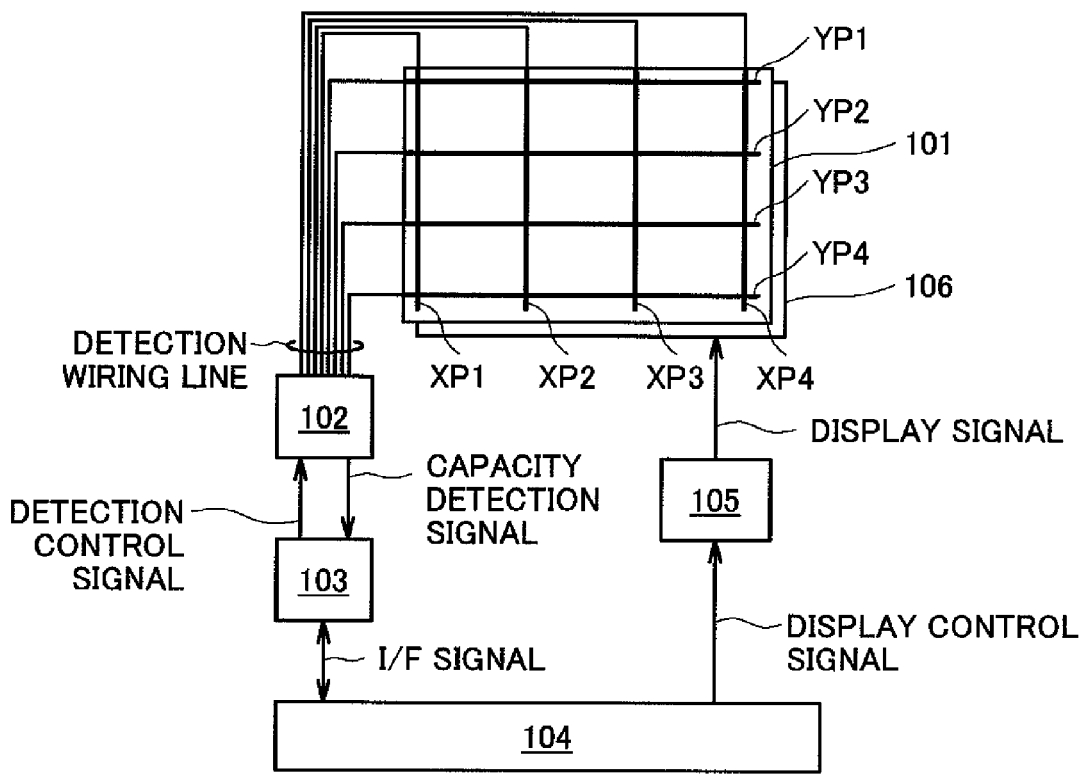
FIG. 1 is a system block diagram of an input device according to an embodiment of the present invention and a display device including the input device.

Referring to the drawings, an embodiment of the present invention is described below in detail.

First Embodiment

FIG. 1 illustrates configurations of an input device (hereinafter, referred to as touch panel) and a display device including the input device.

In FIG. 1, a touch panel according to a first embodiment of the present invention is represented by 101. The touch panel 101 includes X and Y electrodes XP and YP for capacity detection. Four (XP1 to XP4) X electrodes and four (YP1 to YP4) Y electrodes, for example, are illustrated in this case. However, the numbers of electrodes are not limited thereto. The touch panel 101 is installed on a front side of a display portion 106 of a display device. Thus, when a user views an image displayed on the display portion 106 of the display device, a transmittance of the touch panel is desirably high because the displayed image needs to pass through the touch panel. The X and Y electrodes of the touch panel 101 are connected to a capacity detection unit 102 via detection wiring lines. The capacity detection unit 102 is controlled based on a detection control signal output from a control calculation unit 103 to detect a capacity of each electrode (each of X and Y electrodes) included in the touch panel, and to output a capacity detection signal changed depending on a capacity value of each electrode to the control calculation unit 103. The control calculation unit 103 calculates a signal component of each electrode from the capacity detection signal of each electrode, and calculates input coordinates from the signal component of each electrode. A system 104 generates, when receiving the input coordinates transferred from the touch panel 101 by a touch operation, a displayed image according to the touch operation, and transfers the displayed image as a display control signal to a display control circuit 105. The display control circuit 105 generates a display signal according to the displayed image transferred as the display control signal, and displays an image on the display portion 106 of the display device.

Figure 2:
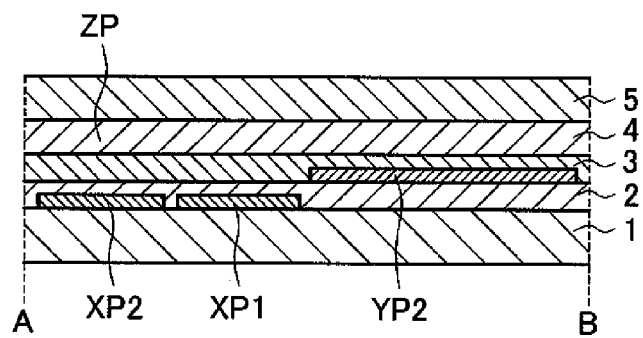
FIG. 2 is a cross section illustrating an electrode structure of a touch panel according to the embodiment of the present invention.
Figure 3:
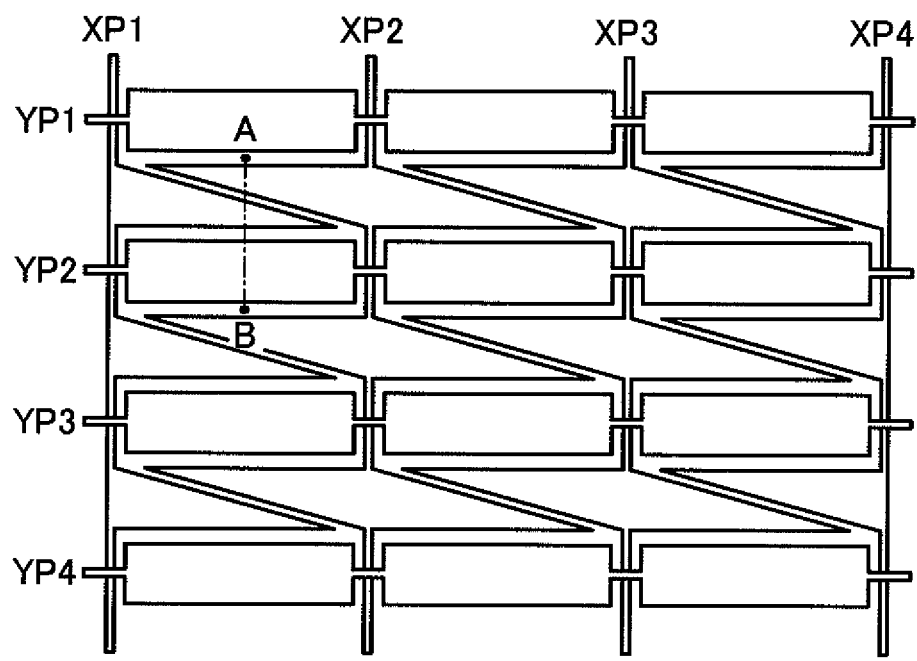
FIG. 3 is a cross section illustrating the electrode structure of the touch panel according to the embodiment of the present invention.

FIG. 2 illustrates a structure of the touch panel of this embodiment, illustrating a cross sectional shape of the touch panel 101 from the point A to the point B of FIG. 3. This cross sectional view illustrates only layers that are necessary for description of an operation of the touch panel. In FIG. 2, the touch panel 101 includes transparent substrates 1 and 5, transparent insulating layers 2 and 3, a transparent elastic conductive resin layer 4, and the detection electrodes XP, YP, and ZP.

The touch panel of this embodiment is a touch panel including the first transparent substrate 1, on which the transparent conductive film XP, the first transparent insulating film 2, the transparent conductive film YP, the second transparent insulating film 3, and a transparent elastic conductive resin layer ZP4 in which conductive fine particles are dispersed are laminated in this order, and the second transparent substrate 5 is further formed thereon.

Next, the capacity detection electrodes that are provided to the touch panel 101 according to the first embodiment of the present invention are described with reference to FIGS. 3, 4A, 4B, 5A, and 5B.

FIG. 3 is a diagram illustrating an electrode pattern of the X electrodes XP and the Y electrodes YP for capacity detection in the touch panel 101. The X electrodes XP and the Y electrodes YP are connected to the capacity detection unit 102 via the detection wiring lines. The Y electrodes extend in the horizontal direction in the touch panel 101, and a plurality of the Y electrodes are arranged in the vertical direction. At intersections of the Y electrodes and the X electrodes, electrode widths of the Y electrode and the X electrode are made thin in order to reduce cross capacity of each electrode. This portion is referred to as a thin line portion, temporarily. Therefore, the Y electrode has thin line portions and other electrode portions (hereinafter, referred to as pad portions) arranged alternately in the extending direction. Between neighboring Y electrodes, the X electrodes are arranged. The X electrodes extend in the vertical direction in the touch panel 101, and a plurality of the X electrodes are arranged in the horizontal direction. Similarly to the Y electrodes, the X electrode also has thin line portions and the pad portions arranged alternately in the extending direction.

Next, a shape of the pad portion of the X electrode is described, assuming that a wiring position for connecting the X electrode to the detection wiring line (or the thin line portion of the X electrode) is the center of the X electrode in the horizontal direction. The pad portion of the X electrode has an electrode shape such that the area thereof becomes smaller as being closer to the center of the neighboring X electrode, while becoming larger as being closer to the center of the X electrode concerned. Therefore, considering an area of the X electrode between two neighboring X electrodes, e.g., an area between XP1 and XP2, the electrode area of the pad portion of the X electrode XP1 becomes maximum while the electrode area of the pad portion of the X electrode XP2 becomes minimum at the middle portion of the X electrode XP1. In contrast, at the middle portion of the X electrode XP2, the electrode area of the pad portion of the X electrode XP1 becomes minimum while the electrode area of the pad portion of the X electrode XP2 becomes maximum.

Next, the layer structure of the touch panel 101 is described in order of from the nearest layer to the farthest layer with respect to the first transparent substrate 1. The material, the thickness, and the like of the first transparent substrate 1 are not particularly limited and, depending on the application and use thereof, the first transparent substrate 1 is preferably selected from materials including inorganic glass such as barium borosilicate glass and soda glass, chemically strengthened glass, and resin films such as polyether sulfone (PES), polysulfone (PSF), polycarbonate (PC), polyarylate (PAR), and polyethylene terephthalate (PET). Further, the electrodes to be used for XP and YP are a transparent conductive film, which is not particularly limited as long as the electrode is a conductive thin film. Conventional examples which may be used include indium tin oxide (ITO), antimony tin oxide (ATO), and indium zinc oxide (IZO). The transparent conductive film (having a thickness of 50 to 200 Å) is formed, so as to make the surface resistance 500 to 2,000Ω, using a sputtering method, and patterning is conducted using an exposure and developing process after application of the resist material. Here, the resist material may be any one of a positive and a negative type, and may be easily formed with an alkali development type. After that, ITO is patterned to be formed by etching. Here, the etchant to be used is preferably selected from an aqueous hydrobromic acid solution or the like.

The X electrode XP is formed at a portion close to the first transparent substrate 1, and then the first insulating film 2 is formed for insulating the X electrode and the Y electrode from each other. Next, the Y electrode YP is formed. Here, the order of the X electrode XP and the Y electrode YP may be exchanged. After the Y electrode YP, the second insulating film 3 is disposed so as to secure insulation between the Y electrodes YP and the Z electrode ZP to be disposed next. Film thicknesses of the first insulating film 2 and the second insulating film 3 are selected appropriately considering a dielectric constant of the insulating film material. It is easy to set the specific dielectric constant to a value from 2 to 4, and the film thickness may be set to a value from 1 to 20 μm. Used as a material of the insulating film layer is an ultraviolet (UV) curing resin material, a negative or positive insulating film material that may be developed with alkaline, or a thermosetting resin material that is cured by heat. The alkali development type may be formed easily.

The transparent elastic conductive resin layer 4 is a resin layer in which conductive fine particles are dispersed. The dispersed individual fine particles are overlapped in the direction of the surface of the first transparent substrate and in the direction perpendicular to the surface, and the resin is disposed between the fine particles. The conductive fine particles are mixed in order that a resistance of the Z electrode ZP be lowered by the pressure applied by the pen so that a closed circuit is formed between XP1 and XP2 and the capacity change is transmitted. In addition, in order to obtain uniform pressure responsiveness in the entire surface of the touch panel 101, it is preferable that the grain diameter be uniform, and fine particles having a spherical shape, a needle shape, a plate shape, or the like may be selected appropriately. In addition, the grain diameter of the conductive fine particle is selected from a range of 0.01 to 5 μm. As the conductive fine particles, it is sufficient that the conductive fine particles have at least a conductive layer on the surface. For example, metal fine particles made of nickel, gold, silver, copper, or the like, insulating inorganic fine particles, or resin fine particles coated with metal may be used. Further, fine particles made of at least one kind of metal oxide or metal fluoride selected from the group consisting of $Al_2O_3$, $Bi_2O_3$, $CeO_2$, $In_2O_3$, $(In_2O_3.SnO_2)$, $HfO_2$, $La_2O_3$, $MgF_2$, $Sb_2O_5$, $(Sb_2O_5.SnO_2)$, $SiO_2$, $SnO_2$, $TiO_2$, $Y_2O_3$, $ZnO$, and $ZrO_2$ may be used. In addition, fine particles of polyaniline, polyacetylene, polyethylene dioxythiophene, polypyrrole, polyisothianaphthene, polyisonaphthothiophene, and the like may also be used. As the fine particles, materials having low optical absorption and scattering as a result of optical refractive index and optical reflection are preferably appropriately selected.

A resin to be used in the resin layer with the dispersed conductive fine particles is particularly preferably a material having transparency and elasticity. However, the resin is not limited thereto and a material having a refractive index close to a transparent electrode is preferable in order to improve the transmittance. Examples of the material include butyl rubber, fluorocarbon rubber, ethylene-propylene-diene monomer rubber (EPDM), acrylonitrile-butadiene rubber (NBR), chloroprene rubber (CR), natural rubber (NR), isoprene rubber (IR), styrene-butadiene rubber (SBR), butadiene rubber, ethylene-propylene rubber, silicone rubber, polyurethane rubber, polynorbornene rubber, styrene-butadiene-styrene rubber, epichlorohydrin rubber, hydrogenated NBR, polysulfide rubber, and urethane rubber. Those rubbers may be used alone, or two or more kinds of them may be used in combination. Further examples of the material include polymer resins such as polyvinyl alcohol, an acrylic resin, and a urethane resin. The refractive index of those rubbers and resins is preferably in the range of 1.4 to 1.8, and the film thickness is preferably in the range of 0.5 to 200 μm.

The material of the second transparent substrate 1 is not limited to a particular material. But, because it is necessary to transmit the compression force of the pressing to the transparent elastic conductive resin layer 4, it is not preferable to use inorganic glass such as barium borosilicate glass or soda glass, or chemically strengthened glass. It is preferable to select the material of the second transparent substrate 1 from resins having elasticity such as polyether sulfone (PBS), polysulfone (PSF), polycarbonate (PC), polyarylate (PAR), and polyethylene terephthalate (PET), and a material consisting of the resin and additional elastomer component for improving the elasticity. Using those materials, the stiffness becomes higher than that of the transparent elastic conductive resin layer 4. Therefore, the pressure may be transmitted to the resin layer 4 more easily. In addition, in order to satisfy the above-mentioned elasticity, it is preferable that the thickness of the second transparent substrate 5 be 800 μm or smaller. Further, if a film is used as the second transparent substrate 5, a deformation of the transparent elastic conductive resin layer 4 becomes so large when a large load is imposed that the interface between the second transparent substrate 5 and the transparent elastic conductive resin layer 4 is apt to be peeled. Therefore, it is preferable that the thickness of the second transparent substrate 5 be 100 μm or larger.

Next, the capacity change in the touch operation of the touch panel 101 according to the first embodiment of the present invention is described with reference to FIGS. 4A, 4B, 5A, and 5B.

Figure 4A:
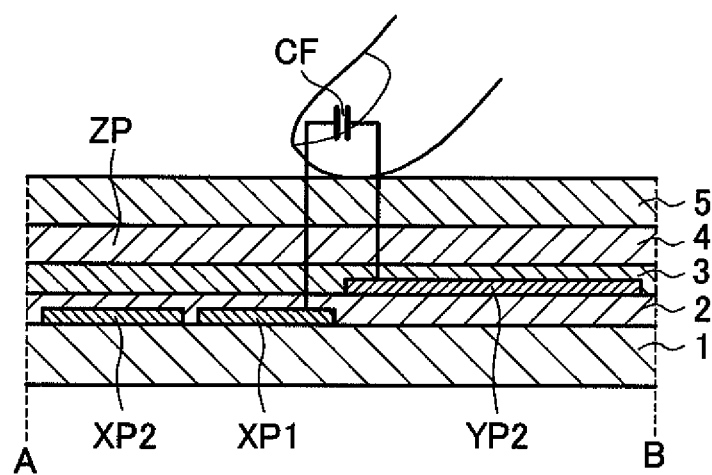
FIGS. 4A and 4B are schematic diagrams illustrating a capacity change in an input operation by a finger in the touch panel according to the embodiment of the present invention.
Figure 4B:
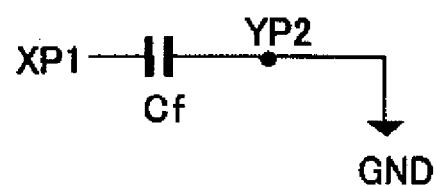

FIGS. 4A and 4B are schematic diagrams illustrating the capacity change in the case where the input means of the touch operation is a conductor such as a finger. Here, it is assumed that the pressure of the touch operation is so small that the thickness of the transparent elastic conductive resin layer 4 does not change. This assumption may be considered to be reasonable because a finger is soft and the contact surface is large. In addition, the electrode capacity of each electrode is a combined capacity of a fringe capacity with neighboring electrodes, a cross capacity, and other parasitic capacity, but here, only a parallel flat plate capacity with the Z electrode is noted while other electrode capacity is supposed to be unchanged between the touch operation and anon-touch operation.

When the electrode capacity of the X electrode XP1 is detected by the capacity detection unit 102, the Y electrode YP2 becomes the GND potential in a reset state. Therefore, the combined capacity regarding the X electrode XP1 corresponds to a capacity Cf between the X electrode XP1 and the Y electrode YP2 via the finger as a conductor because the Z electrode ZPA has a high resistance. This case is similar to the capacity detection in the normal electrostatic capacity type touch panel.

Figure 5A:
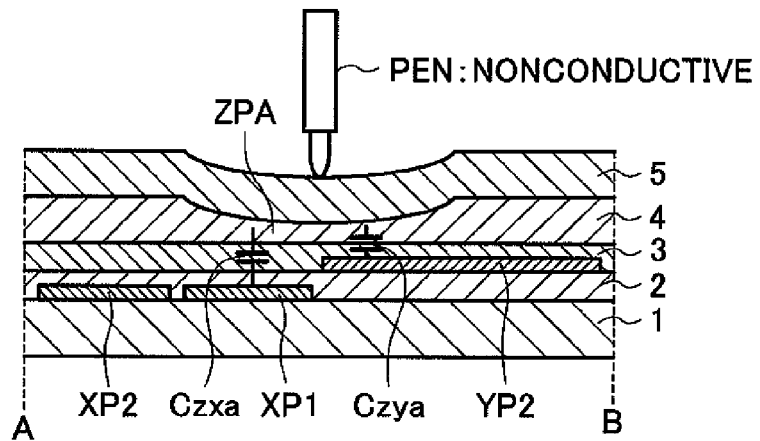
FIGS. 5A and 5B are schematic diagrams illustrating a capacity change in an input operation by a resin pen in the touch panel according to the embodiment of the present invention.
Figure 5B:
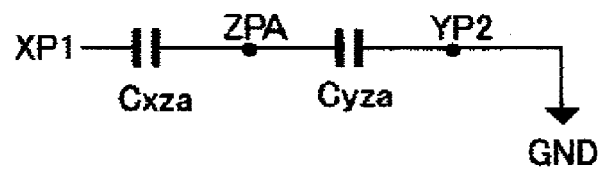

FIGS. 5A and 5B are schematic diagrams illustrating a capacity change in the case where the input means of the touch operation is nonconductive, and the thickness of the transparent elastic conductive resin layer 4 changes by the pressure of the touch operation. Here, it is assumed that the pressure of the touch operation is so large that the thickness of the transparent elastic conductive resin layer 4 changes at the touched portion. This assumption may be considered to be reasonable because the pen is hard and has a small contact surface. The capacity without the touch operation corresponds to a very small capacity between neighboring electrodes via the insulating film 2 between the X electrode XP1 and the Y electrode YP2. When being touched with the pen, the transparent elastic conductive resin layer 4 at the touched portion is compressed in the direction perpendicular to the surface of the transparent substrate 1, with the result that a distance between the conductive fine particles dispersed inside the transparent elastic conductive resin layer 4 is decreased in the vertical direction, resulting in increase of the density. As a result, the resistance value of the transparent elastic conductive resin layer 4 at the touched portion is decreased. In the case where the resistance value of the Z electrode ZPA is decreased by the pressure in the touch operation, the capacity between the Z electrode ZPA and the X electrode XP1 is represented by Cxza, and the capacity between the Z electrode ZPA and the Y electrode YP2 is represented by Cyza. When the capacity detection unit 102 detects the electrode capacity of the X electrode XP1, the Y electrode YP2 becomes the GND potential in the reset state. Therefore, the combined capacity regarding the X electrode XP1 is a capacity of Cxza and Cyza connected in series, because the Z electrode ZPA is in the floating state. The combined capacity Cxpa of the X electrode is expressed by the expression below.

$$Cxpa = Cxza \cdot Cyza/(Cxza + Cyza) \qquad \text{Expression (1)}$$

The control calculation unit 103 calculates an XP1 electrode capacity Cxpa in the touch operation as a signal component of the X electrode XP1. Electrode capacity values in the presence and the absence of the touch operation may be detected by the capacity detection unit 102. Therefore, the control calculation unit 103 may calculate the signal component of the X electrode XP1.

As described above, by using the Z electrode ZP as the transparent elastic conductive resin layer 4, even if the nonconductive input means is used, the thickness of the transparent elastic conductive resin layer 4 changes by the pressure so that the capacity changes. Thus, the input coordinates may be detected from the capacity change.

Figure 6:
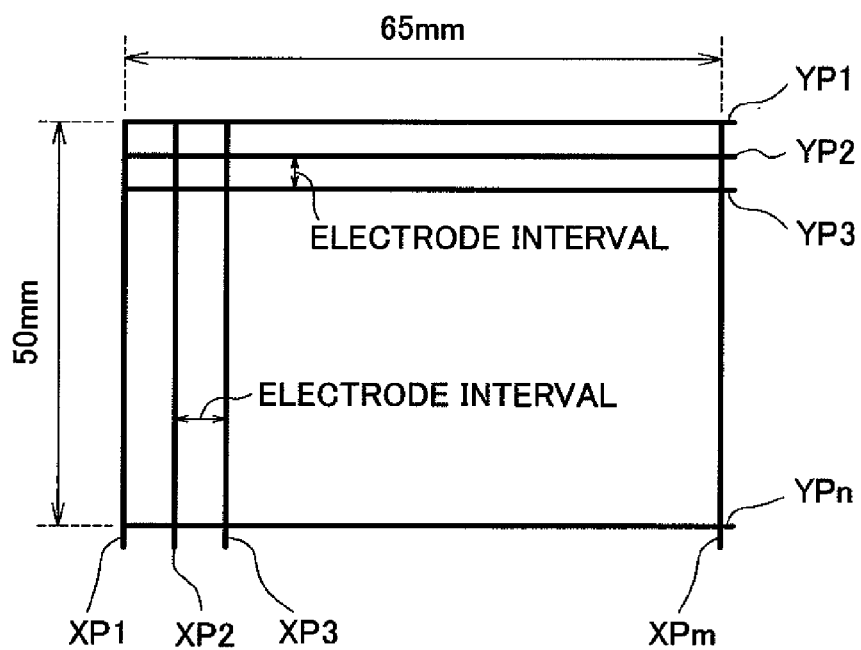
FIG. 6 is a layout diagram of capacity detection electrodes in a touch panel.

In order to show the capacity detection effect due to the electrode shapes of the X electrode, the Y electrode, and the Z electrode in the above-mentioned first embodiment of the present invention, signal intensity values are measured by using the touch panel having a diagonal size of 4 inches (the aspect ratio is supposed to be 3:4) as illustrated in FIG. 6. In FIG. 6, shapes of the X electrodes and the Y electrodes are simplified, but actually, the X electrodes and the Y electrodes having the shapes illustrated in FIG. 3 are arranged at electrode intervals illustrated in FIG. 6.

The density of the conductive fine particles dispersed in the transparent elastic conductive resin layer 4 may be adjusted based on a film thickness of the second insulating layer 3, a dielectric constant thereof, a film thickness of the transparent elastic conductive resin layer 4, and a detection circuit as appropriate. It is preferable to set to a low density in order to avoid light scattering and a decrease in transmittance due to concentration of the conductive fine particles.

Figure 7:
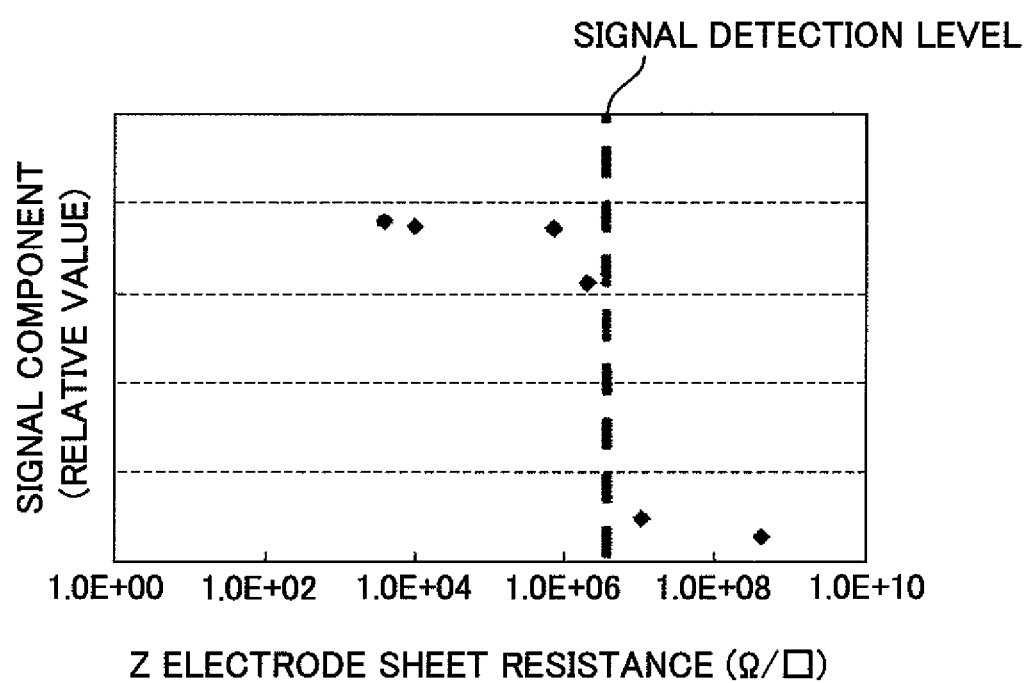
FIG. 7 is a graph illustrating a resistance value of a Z electrode and signal intensity in the embodiment of the present invention.

As illustrated in FIG. 7, there is a threshold value of the resistance value as understood from a relationship between a resistance value of the Z electrode obtained from the circuit for use and the obtained signal. The horizontal axis represents a sheet resistance ($\Omega/\square$) of the Z electrode, and the vertical axis represents the signal component (relative value). It is preferable that the density of the conductive fine particles in the Z electrode be adjusted so that the plotted points exist in the right side region (high resistance) of FIG. 7 before the touch operation, and that the plotted points move to the left side region (low resistance) of FIG. 7 beyond the threshold value by the pressure of the touch.

As described above, according to the embodiment of the present invention, even in the case where the nonconductive input means contacts the touch panel, in addition to the X electrode and the Y electrode for capacity detection, and the Z electrode over the X electrode and the Y electrode is compressed so that a resistance value thereof is changed. Thus, a capacity change may be generated so that the input coordinates may be detected as an electrostatic capacity type.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An electrostatic capacity type touch panel, comprising:
    a first transparent substrate;
    a plurality of X electrodes, a plurality of Y electrodes, and a Z electrode, which are disposed on the first transparent substrate;
    a first insulating layer disposed between the plurality of X electrodes and the plurality of Y electrodes that cross each other;
    a second insulating layer disposed between the Z electrode and the plurality of X electrodes as well as the plurality of Y electrodes; and
    a second transparent substrate disposed on a touched side of the touch panel,
    wherein the Z electrode is formed so as to overlap the plurality of X electrodes and the plurality of Y electrodes in a plan view,
    wherein the Z electrode is configured to have a reduced thickness in response to a pressure of a touch operation,
    wherein the Z electrode is configured to have a reduced resistance value when the thickness of the Z electrode is reduced, and
    wherein the Z electrode is configured so that reducing the resistance value of the Z electrode generates a change in capacitance between the Z electrode and the plurality of X electrodes, and generates a change in capacitance between the Z electrode and the plurality of Y electrodes so that coordinates of a touch position are detected.

2. The electrostatic capacity type touch panel according to claim 1, wherein the Z electrode is electrically floating and comprises a member formed of a transparent high polymer elastic resin layer in which conductive fine particles are dispersed.

3. The electrostatic capacity type touch panel according to claim 2, wherein each of the conductive fine particles contained in the Z electrode has an average grain diameter in a range of from 0.01 to 5 µm.

4. The electrostatic capacity type touch panel according to claim 3, wherein the Z electrode has a thickness in a range of from 0.5 to 200 µm.

5. The electrostatic capacity type touch panel according to claim 4, wherein the second transparent substrate has a thickness in a range of from 100 to 800 µm.

6. A display device, comprising:
a display portion; and
the electrostatic capacity type touch panel according to claim 1 disposed on a front side of the display portion.

7. The electrostatic capacity type touch panel according to claim 1,
wherein the Z electrode is configured to decrease in resistance value when the Z electrode is compressed by the pressure of the touch operation regardless of whether the touch operation is applied with a conductive member or a non-conductive member.

8. An electrostatic capacity type touch panel, comprising: a first substrate including a plurality of X electrodes and a plurality of Y electrodes; a first insulating layer disposed between the plurality of X electrodes and the plurality of Y electrodes; an elastic layer comprised of an elastic member and a plurality of conductive members overlapping via the elastic member in a direction perpendicular to a surface of the first substrate,
a second insulating layer disposed between the elastic layer and the plurality of X electrodes as well as the plurality of Y electrodes,
wherein the elastic layer is configured to have a reduced thickness in response to a pressure of a touch operation,
wherein the elastic layer is configured to have a reduced resistance value when the thickness of the elastic layer is reduced, and
wherein the elastic layer is configured so that reducing the resistance value of the elastic layer generates a change in capacitance between the elastic layer and the plurality of X electrodes, and generates a change in capacitance between the elastic layer and the plurality of Y electrodes so that coordinates of a touch position are detected.

9. The electrostatic capacity type touch panel according to claim 8, further comprising a second substrate which is disposed on the elastic layer and has stiffness higher than stiffness of the elastic layer.

10. The electrostatic capacity type touch panel according to claim 8, wherein the plurality of conductive members comprise conductive particles.

11. The electrostatic capacity type touch panel according to claim 8,
wherein the elastic layer is configured to decrease in resistance value when the elastic layer is compressed by the pressure of the touch operation regardless of whether the touch operation is applied with a conductive member or a non-conductive member.

12. An electrostatic capacity type touch panel, comprising:
a first substrate including a plurality of X electrodes and a plurality of Y electrodes;
a first insulating layer disposed between the plurality of X electrodes and the plurality of Y electrodes;
an elastic layer has a plurality of conductive particles dispersed thereinside;
a second insulating layer disposed between the elastic layer and the plurality of X electrodes as well as the plurality of Y electrodes, and
a second substrate which is disposed on the elastic layer and has stiffness higher than stiffness of the elastic layer,
wherein the elastic layer is configured to have a reduced thickness in response to a pressure of a touch operation,
wherein the elastic layer is configured to have a reduced resistance value when the thickness of the elastic layer is reduced, and
wherein the elastic layer is configured so that reducing the resistance value of the elastic layer generates a change in capacitance between the elastic layer and the plurality of X electrodes, and generates a change in capacitance between the elastic layer and the plurality of Y electrodes so that coordinates of a touch position are detected.

13. The electrostatic capacity type touch panel according to claim 12,
wherein the elastic layer is configured to decrease in resistance value when the elastic layer is compressed by the pressure of the touch operation regardless of whether the touch operation is applied with a conductive member or a non-conductive member.

* * * * *